(12) United States Patent
Vezzoli et al.

(10) Patent No.: US 12,724,488 B2
(45) Date of Patent: Sep. 1, 2026

(54) METHOD AND APPARATUS OF ENCODING/DECODING HAPTIC DATA

(71) Applicant: WYVRN, Lille (FR)

(72) Inventors: Eric Vezzoli, Lille (FR); Alexandre Hulsken, Lille (FR); Titouan Rabu, Lille (FR); Victor Prudhomme, Lille (FR); Antoine Mariton, Lille (FR)

(73) Assignee: WYVRN, Lille (FR)

( * ) Notice: Subject to any disclaimer, the term of this patent is extended or adjusted under 35 U.S.C. 154(b) by 56 days.

(21) Appl. No.: 18/696,116

(22) PCT Filed: Sep. 26, 2022

(86) PCT No.: PCT/EP2022/076708
§ 371 (c)(1),
(2) Date: Mar. 27, 2024

(87) PCT Pub. No.: WO2023/052305
PCT Pub. Date: Apr. 6, 2023

(65) Prior Publication Data

US 2024/0402813 A1 Dec. 5, 2024

(30) Foreign Application Priority Data

Sep. 29, 2021 (EP) .................................... 21306351

(51) Int. Cl.
*G06F 3/01* (2006.01)

(52) U.S. Cl.
CPC .................................. *G06F 3/016* (2013.01)

(58) Field of Classification Search
CPC ...... G06F 3/01; G06F 3/016; G06F 2203/014; G06F 2203/04809
See application file for complete search history.

(56) References Cited

U.S. PATENT DOCUMENTS

2007/0236449 A1* 10/2007 Lacroix .................. G06F 3/016
345/156

FOREIGN PATENT DOCUMENTS

EP 3099030 A1 * 11/2016 .............. G06F 3/011
EP 3112987 A1 * 1/2017 ............ G06F 3/016
EP 3618450 A1 * 3/2020 ............... G08B 6/00

OTHER PUBLICATIONS

International Search Report from International Application No. PCT/EP2022/076708 Jan. 18, 2023, 3 pgs.

* cited by examiner

*Primary Examiner* — Quan Zhen Wang
*Assistant Examiner* — Mancil Littlejohn, Jr.
(74) *Attorney, Agent, or Firm* — Tutunjian & Bitetto, P.C.

(57) ABSTRACT

Methods and apparatus of encoding/decoding haptic signal representative of haptic effect. The haptic signal is encoded according to a hierarchical representation, which includes a plurality of layers, a different hierarchical level being associated with each layer. The encoding of the haptic signal comprises the encoding, in the first layer, of a first set of base signals, which includes one or more base signals. First data representative of each base signal of the first set is encoded in this first layer, each base signal being represented in a determined space. Second data is encoded in the first layer in addition to the first data, the second data being representative of modulation of each base signal. Third data representative of the determined space is then encoded in a layer, different from the first layer, having a hierarchical level higher than a hierarchical level of the first layer.

16 Claims, 7 Drawing Sheets

METHOD AND APPARATUS OF ENCODING/DECODING HAPTIC DATA

CROSS-REFERENCE TO RELATED APPLICATIONS

This application claims the benefit, under 35 U.S.C. § 365 of International Application PCT/EP2022/076708, filed Sep. 26, 2022, which was published in accordance with PCT Article 21 (2) on Apr. 6, 2023, in English and which claims the benefit of European patent application No. 21306351.4 filed Sep. 29, 2021.

FIELD

The present application generally relates to haptic data compression and, in particular, to methods and apparatus of encoding/decoding data representative of haptic effects.

BACKGROUND

The present section is intended to introduce the reader to various aspects of art, which may be related to various aspects of at least one exemplary embodiments of the present application that is described and/or claimed below. This discussion is believed to be helpful in providing the reader with background information to facilitate a better understanding of the various aspects of the present application.

Haptic technology broadly refers to any technology recreating the sense of touch in a user interface by applying force, vibration, motion and other feelings to provide information to an end user.

Haptic feedback covers a wide range of possible stimulation embodiments but is mainly divided into tactile haptic technology and kinesthetic haptic technology: tactile haptic feedback refers to sensations such as vibration, friction, or micro-deformation while kinesthetic haptic feedback refers to sensations that provide force sensations that can stimulate both mechanical stimuli as well as stimuli related to the position and the movement of the body.

The rendering of haptic feedback or haptic effect is obtained using haptic device also called haptic actuators. For example, vibrotactile effects might be obtained with the use of haptic devices such as ERMs (Eccentric Rotating Mass), LRAs (Linear Resonant Actuators), and large bandwidth actuators like VCM (Voice Coil Motors), or PZT (Piezoelectric Actuators). Kinesthetic effects might be rendered with actuators exercising a force impeding a limb movement, such effects being merely felt on the muscles and tendons than on the skin. Other examples of haptic devices comprise resistive force feedback devices, active force feedback devices and skin indentation devices.

Haptic feedback has been increasingly incorporated in portable electronic devices, referred to as "handheld devices" or "portable devices," such as cellular phones, smartphones, and portable gaming devices. For example, some portable gaming applications are capable of vibrating in a manner similar to control devices (e.g., joysticks, etc.) used with larger-scale gaming systems that are configured to provide haptic feedback. Additionally, devices such as cellular phones and smartphones are capable of providing various alerts to users by way of vibrations. Further, haptic effects can be used to simulate "real world" dynamic events, such as the feel of a bouncing ball in a video game.

For rendering haptic effects or haptic feedback on the end-user side, data and/or signals representative of the haptic effects to be rendered have to be encoded then transported to the haptic devices.

In the technical field of haptic effects, the encoding of haptic signal representative of the haptic effects mainly follows 2 different approaches, namely:

- encoding of the haptic signal in a Pulse Code Modulation (PCM) file; or
- encoding of a set of parameters, under the form of vectorial data, allowing to reconstruct the haptic signal In the first case (encoding of the haptic signal in a PCM file), CSV or WAV files may be used. Such a solution is memory intensive but enables to store complex haptic signals. Such an encoding has the disadvantages of not being easily modified once encoded. In addition, the amplitude modulation cannot be easily separated from the frequency modulation, which is the problem when the haptic signal is to be rendered with different classes of actuators (e.g., voice coils are able to render amplitude and frequency modulated signals while LRAs are limited to amplitude modulated signals).

In the second case (encoding of parameters, also known as vectorial encoding), the haptic signal is encoded as a combination of functions to be rendered by the rendering engine. Such a solution has the advantage of being easily modified at run time by the application using this haptic signal. Nevertheless, such a solution has the disadvantage that it is assumed that a determined rendering model is implemented in the rendering engine.

In the last few years, several solutions based on the encoding of vectorial-based haptic data have been developed.

For example, a files format has been developed and proposed by Apple®, which is known with the acronym AHAP (Apple Haptic Audio Pattern). AHAP files are JSON-compliant (JavaScript Object Notation) dictionary representations of haptic and audio patterns that may be composed in a text editor or any program that is configured to export content in the JSON format. AHAP format enables only the encoding of vibrotactile feedbacks and does not enable the encoding of other haptic effects such as kinesthetic feedbacks. In addition, AHAP is also restricted to be rendered by the Core Haptic libraries by Apple®, such libraries being limited to rendering engines run on iOS®-compliant devices.

Another files format has been developed and proposed by Immersion Corporation, which is known with the acronym IVS (Immersion Vibration Source). IVS files have an extensible markup language ("XML") format. IVS format enables only the encoding of vibrotactile feedbacks and does not enable the encoding of other haptic effects such as kinesthetic feedbacks.

Existing formats for haptic data encoding present many limitations and do not enable to encode the various types of haptic effects users are expecting to increase user-experience in terms of immersion feeling.

SUMMARY

The following section presents a simplified summary of at least one exemplary embodiment in order to provide a basic understanding of some aspects of the present application. This summary is not an extensive overview of an exemplary embodiment. It is not intended to identify key or critical elements of an embodiment. The following summary merely presents some aspects of at least one of the exemplary embodiments in a simplified form as a prelude to the more detailed description provided elsewhere in the document.

According to a first aspect of the present application, there is provided a method of encoding a haptic signal representative of haptic effect in a bitstream of encoded haptic signal data. To reach that aim, a hierarchical representation of the haptic signal is encoded, the hierarchical representation comprising a plurality of layers, a hierarchical level being associated with each layer of the plurality of layers, wherein the encoding comprises:

encoding, in a first layer of the plurality of layers, first data representative of modulation of at least a base signal; and encoding, in a layer of the plurality of layers having a hierarchical level upper than a hierarchical level of the first layer, second data representative of a haptic perception modality.

In an exemplary embodiment, the method further comprises encoding, in the first layer, a first set of base signals comprising the at least a base signal by encoding third data representative of each base signal of said first set, said each base signal being represented in a determined space, said determined space being according to said haptic perception modality.

In an exemplary embodiment, the third data comprises:

data representative of a type of the at least a base signal; and/or data representative of a phase of the at least a base signal, and the first data comprises data representative of coordinates of a plurality of points in the determined space.

In another exemplary embodiment, the plurality of layers further comprises a second layer having a hierarchical level upper than the hierarchical level of the first layer, a third layer having a hierarchical level upper than the hierarchical level of the second layer and a fourth layer having a hierarchical level upper than the hierarchical level of the third layer.

In a further exemplary embodiment, the encoding of the haptic signal further comprises:

encoding, in the second layer, a second set of sequences comprising at least a sequence of one or more modulated signals, by encoding, for each sequence of the second set, first information representative of a sequential order of the one or more modulated signals in each sequence, each modulated signal being obtained from a base signal of the first set modulated from the second data associated with the base signal;

encoding, in the third layer, a third set of first combinations comprising at least a first combination of one or more sequences of the second set, by encoding, for each first combination, second information representative of a number of sequences comprised in each first combination; and encoding, in the fourth layer, a second combination of one or more first combinations of the third set, by encoding third information representative of a number of first combinations comprised in the second combination.

In an additional exemplary embodiment, at least a sequence of the second set comprises a plurality of modulated signals obtained from different types of base signals.

In another exemplary embodiment, the at least a base signal corresponds to a constant signal.

In a further exemplary embodiment, the encoding of the haptic signal further comprises encoding metadata in at least one layer of the plurality, at least a part of the metadata comprising data representative of an Application Program Interface call associated with the at least a base signal.

According to a second aspect of the present application, there is provided a method of decoding a haptic signal from encoded haptic signal data, the method comprising decoding a hierarchical representation of the haptic signal, the hierarchical representation comprising a plurality of layers, a hierarchical level being associated with each layer of the plurality of layers, the decoding comprising:

decoding, from a first layer of the plurality of layers, first data representative of modulation of at least a base signal; and decoding, from a layer of the plurality of layers having a hierarchical level upper than a hierarchical level of the first layer, second data representative of a haptic perception modality.

In an exemplary embodiment, the decoding further comprises decoding, from the first layer, a first set of base signals comprising the at least a base signal by decoding third data representative of each base signal of the first set, each base signal being represented in a determined space, the determined space being according to the haptic perception modality.

In an exemplary embodiment, the decoding of the haptic signal further comprises:

decoding, from the second layer, a second set of sequences comprising at least a sequence of one or more modulated signals, by decoding, for each sequence of the second set, first information representative of a sequential order of the one or more modulated signals in said each sequence, each modulated signal being obtained from a base signal of the first set modulated from the second data associated with the base signal;

decoding, from the third layer, a third set of first combinations comprising at least a first combination of one or more sequences of the second set, by decoding, for each first combination, second information representative of a number of sequences comprised in each first combination; and decoding, from the fourth layer, a second combination of one or more first combinations of the third set, by decoding third information representative of a number of first combinations comprised in the second combination.

In another exemplary embodiment, the decoding of the haptic signal further comprises decoding metadata from at least one layer of the plurality, at least a part of the metadata comprising data representative of an Application Program Interface call associated with the at least a base signal.

According to a third aspect of the present application, there is provided an apparatus of encoding a haptic signal representative of haptic effect in a bitstream of encoded haptic signal data, wherein the apparatus comprises a memory associated with at least a processor configured to implement the method in accordance with the first aspect of the present application.

According to a fourth aspect of the present application, there is provided an apparatus of decoding a haptic signal representative of haptic effect from a bitstream of encoded haptic signal data, wherein the apparatus comprises a memory associated with at least a processor configured to implement the method in accordance with the second aspect of the present application.

According to a fifth aspect of the present application, there is provided a bitstream carrying data representative of at least a haptic signal representative of at least a haptic effect, the data comprising:

- first data, in a first layer of a plurality of layers having each an associated hierarchical level, representative of modulation of at least a base signal; and
- second data, in a layer of the plurality of layers having a hierarchical level upper than a hierarchical level of the first layer, representative of a haptic perception modality.

In an exemplary embodiment, the bitstream further comprises third data representative of each base signal of a set of base signals comprising the at least a base signal, each base signal being represented in a determined space.

According to a sixth aspect of the present application, there is provided a computer program product including instructions which, when the program is executed by one or more processors, causes the one or more processors to carry out a method according to the first aspect of the present application.

According to a seventh aspect of the present application, there is provided a non-transitory storage medium carrying instructions of program code for executing a method according to the first aspect of the present application.

According to an eighth aspect of the present application, there is provided a computer program product including instructions which, when the program is executed by one or more processors, causes the one or more processors to carry out a method according to the second aspect of the present application.

According to a ninth aspect of the present application, there is provided a non-transitory storage medium carrying instructions of program code for executing a method according to the second aspect of the present application.

According to a tenth aspect of the present application, there is provided a method of rendering haptic feedback, the method comprising:

- receiving a bitstream of data representative of said haptic feedback;
- selecting a haptic rendering model according to an information representative of a haptic perception modality (corresponding to a type of the haptic feedback), the information being comprised in the bitstream;
- generating a haptic signal by processing at least a part of the data comprised in the bitstream with the haptic rendering model;
- transmitting data representative of the haptic signal to at least an actuator to render the haptic feedback.

In an exemplary embodiment, the rendering method further comprises:

- receiving data representative of positions of at least a part of a body, the positions being acquired at a determined frequency;
- upsampling the positions, wherein the generating of the haptic signal being further according to the upsampled positions.

In another exemplary embodiment, the upsampling is according to characteristics of the at least an actuator.

In a further embodiment, the processing at least a part of the data comprised in the bitstream with the haptic rendering model is according to the characteristics of the at least an actuator.

According to an eleventh aspect of the present application, there is provided an apparatus of rendering haptic feedback, wherein the apparatus comprises a memory associated with at least a processor configured to implement the method in accordance with the tenth aspect of the present application The specific nature of at least one of the exemplary embodiments as well as other objects, advantages, features and uses of said at least one of exemplary embodiments will become evident from the following description of examples taken in conjunction with the accompanying drawings.

BRIEF DESCRIPTION OF THE DRAWINGS

Reference will now be made, by way of example, to the accompanying drawings which show exemplary embodiments of the present application, and in which.

Similar reference numerals may have been used in different figures to denote similar components.

DESCRIPTION OF EXEMPLARY EMBODIMENTS

Figure 1:
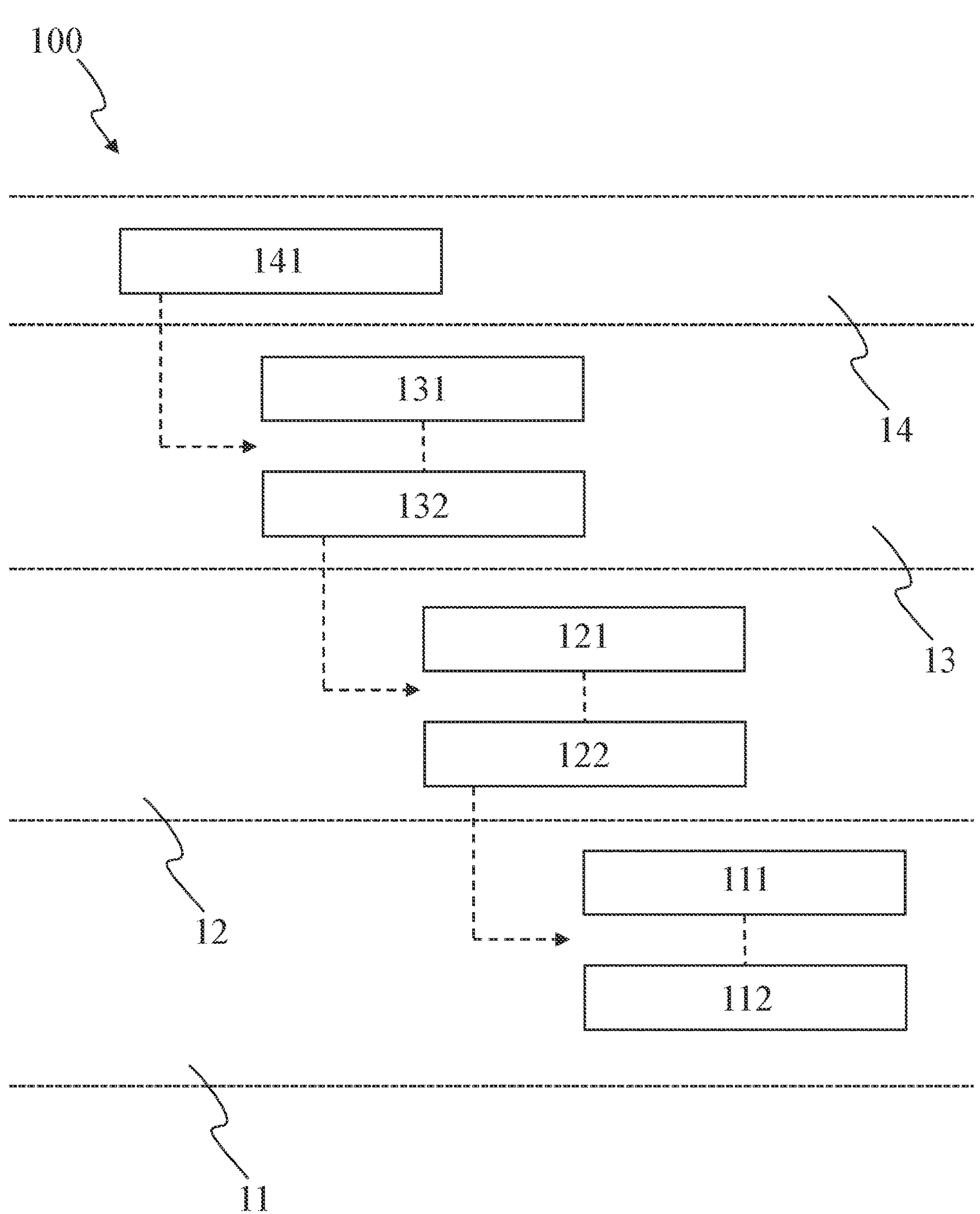
FIG. 1 shows a schematic hierarchical representation of data representative of one or more haptic signals, in accordance with at least one exemplary embodiment.

At least one of the exemplary embodiments is described more fully hereinafter with reference to the accompanying figures, in which examples of at least one of the exemplary embodiments are illustrated. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the disclosure is intended to cover all modifications, equivalents, and alternatives falling within the spirit and scope of the present application.

At least one of the aspects generally relates to a method and apparatus of encoding of one or more haptic signals each representative of haptic effect. Each haptic signal is advantageously encoded according to a hierarchical representation, which comprises a plurality of layers, e.g., 2, 3, 4 or more layers. A determined hierarchical level is associated with each layer, e.g., the lowest hierarchical level is associated with the first layer and the hierarchical level increases with the layers. The encoding of the haptic signal comprises the encoding, in the first layer, of first data representative of modulation of at least a base signal. Second data representative of a haptic perception modality (a haptic perception modality corresponding for example to a type of the haptic feedback, e.g., vibrotactile feedback, force feedback, stiffness feedback, texture feedback or temperature feedback) is then encoded in a layer, different from the first layer, having a hierarchical level upper than a hierarchical level of the first layer. The determined space used as representation space for the base signal(s) is dependent from the haptic perception modality.

The at least a base signal corresponds for example to a constant signal stored or hardcoded in the rendering engine receiving the encoded data representative of the haptic signal.

According to another example, third data representative of the at least a base signal is further encoded into the first layer with the first data.

In brief, the present invention relates to the encoding/decoding of haptic data to enable the rendering of one or more haptic effects by a rendering engine.

The encoding of the haptic perception modality in a layer having a hierarchical level upper than the hierarchical level of the layer into which is encoded the data representative of the modulation and/or of the base signal(s) used to represent the haptic signal enables to optimize the decoding of the data comprised in a received bitstream and representative of the haptic signal.

Indeed, the rendering engine can first determine which haptic perception modality is associated with the haptic signal encoded into the bitstream and whether it is necessary to decode the rest of the data comprised in the lower layer(s). For example, if the rendering device(s) (also called actuator(s)) in communication with the rendering engine is not able to reproduce the haptic perception modality of the encoded haptic signal, there is no need for the rendering engine to decode the data comprised in the bitstream and to render the associated haptic signal.

Such a coding format enables to optimize/reduce processing time at rendering stage according to the characteristics of the haptic device (actuator) communicatively coupled to the rendering engine.

FIG. 1 illustrates a schematic hierarchical structure 100 for representing one or more haptic signals in accordance with at least one exemplary embodiment.

Data representative of the haptic signal may be encoded by an encoder into a determined format according to the hierarchical structure or representation 100 described hereinbelow. For example, the data may be encoded in a haptic effect file or codec, which may have one of many different formats. In certain embodiments, the haptic effect file may have a hierarchical text format corresponding for example to an extensible markup language ("XML") format, a JavaScript Object Notation ("JSON") format or a Yet Another Markup Language ("YMAL") format. In certain other embodiments, the haptic effect file may have a binary format.

The hierarchical representation 100 of the non-limitative embodiments illustrated by FIG. 1 comprises 4 layers 11, 12, 13, 14, the first layer 11 having the lowest hierarchical level, the second layer 12 having a hierarchical level upper than the hierarchical level of the first layer 11, the third layer 13 having a hierarchical level upper than the hierarchical level of the second layer 12 and the fourth layer having the highest hierarchical level, the hierarchical level of the fourth layer 14 being upper than the hierarchical level of the third layer 13.

The number of layers may be different from 4, for example equal to 2, 3, 5. For example, when the number of layers equals 2, the hierarchical representation of the encoding haptic signal only comprises the first layer 11 and the second layer 12. When the number of layers equals 2, the second layer 12 may for example correspond to a header of a datastream or bitstream and the first layer may for example correspond to the payload data of the datastream or bitstream. Such an example is illustrated with FIG. 3.

The layers 11 to 14 of the hierarchical structure or representation 100 comprise encoded data of the haptic signal representative of a haptic feedback or effect to be rendered by a rendering engine.

The haptic signal is encoded into the hierarchical format as a haptic material or haptic file (called second combination in the following) comprising one or more haptic perceptions or haptic tracks (called first combination in the following), each haptic perception (or haptic track) comprising one or more melodies or haptic bands (called sequences of modulated signals in the following), each melody (or haptic band) comprising one or more sequentially ordered haptic notes or haptic waves (called modulated signals in the following, a modulated signal being for example obtained from or encoded under the form of one or more base signals and associated modulation parameters or function).

The first layer 11 comprises first data representative of modulation of one or more base signals.

According to an exemplary embodiment, the first data is representative of the modulation to be applied to a single constant signal, third data representative of this single constant signal being not encoded into the hierarchical representation 100 but stored in a memory of a rendering engine receiving the encoded haptic signal under the form of a bitstream of encoded data.

According to another exemplary embodiment, the first data is representative of the modulation to be applied to one or more base signals forming a first set of base signals 111, 112, the third data representative of each base signal being encoded with the first data representative of modulation in the first layer.

Each base signal is represented in a determined space, which may correspond to one of the following spaces: temporal space, spatial space (for example one-dimensional (1D), two-dimensional (2D) or three-dimensional (3D) spatial space), angular space, or any space based on a measurable dimension like velocity, acceleration, gravity, magnetic field, luminance, temperature, etc.

Figure 2:
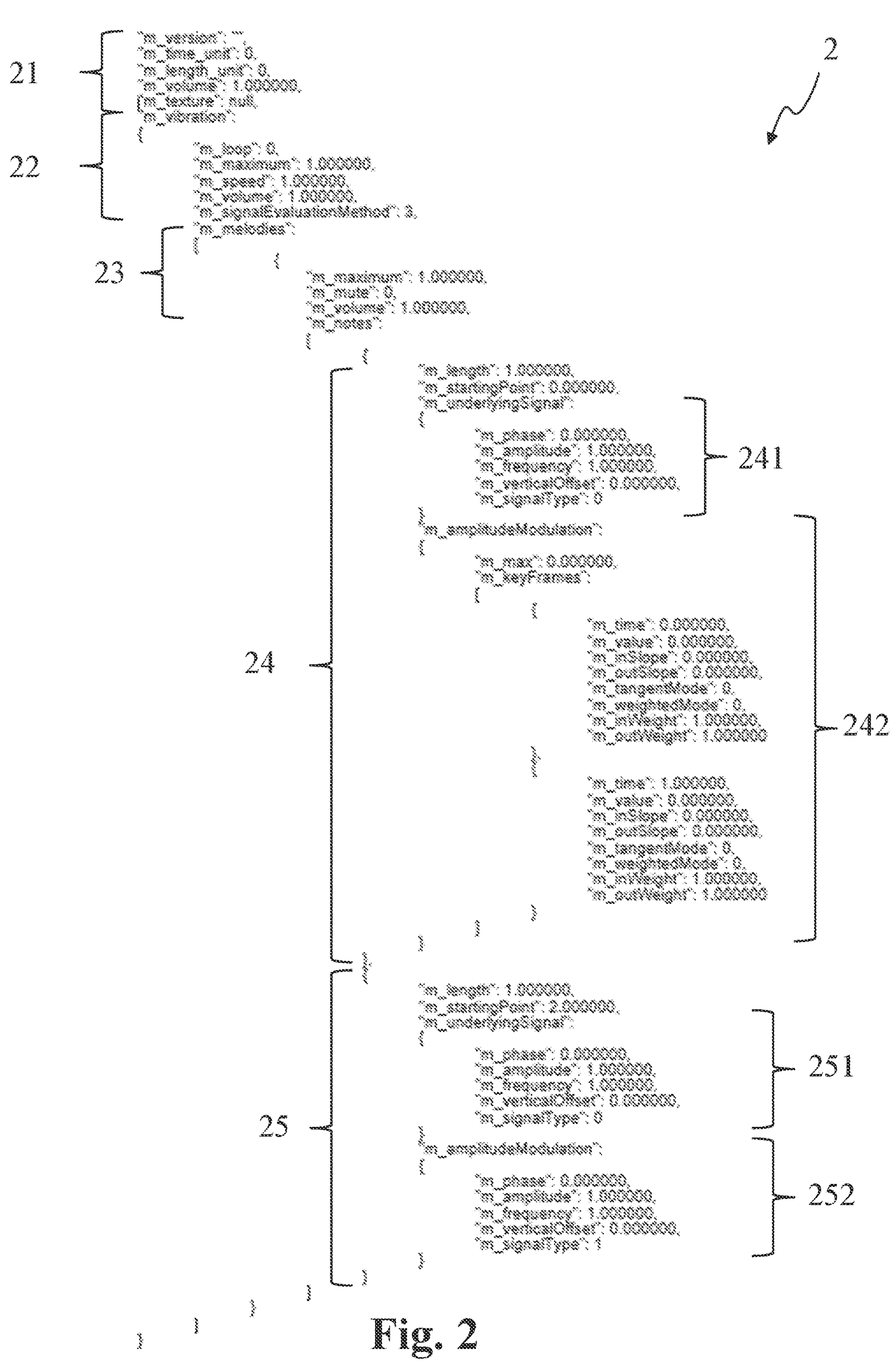
FIG. 2 shows data representative of a haptic signal encoded into a haptic effect file having a hierarchical text format, in accordance with at least one exemplary embodiment.

Examples of base signals 111, 112 and associated modulation are illustrated on FIG. 2.

The third data representative of the base signal encoded into the first layer 11 comprises for example for each base signal:

- data representative of the type of the base signal, e.g., sinusoidal, rectangular, triangular, ramp, continuous, sawtooth; the type of the base signal is for example identified with an identifier that is coded on 3 or 4 bits; and/or data representative of the phase of the base signal; and/or data representative of characteristics of the base signal such as the frequency, the amplitude, an offset.

The first data associated with a base signal corresponds for example to data representative of the coordinates of each point (also called keyframe) of a plurality of points expressed in the determined space.

For example, when the determined space corresponds to a temporal space and the type of modulation to be applied to the base signal is an amplitude modulation, the coordinates of one point comprise an abscissa corresponding to a time 't' and an ordinate corresponding to a value of amplitude. The modulation applied to the base signal at rendering stage is based on the first data, i.e., the coordinates of the points (or key frames), and on a determined interpolating function (for example a third-order polynomial function) using the points encoded in the first layer as key points, as explained with more details hereinbelow in reference to FIG. 2. An interpolating function corresponds for example to a parametric function using as parameters the coordinates of the plurality of points encoded in the first layer 11 under the form of the first data.

According to a variant, the first data associated with a base signal corresponds to data representative of a modulation function, the data corresponding for example to the third data representing a base signal, i.e., the type of the signal, the phase, and characteristics such as the frequency and/or the amplitude.

A set of first data is advantageously associated with each base signal 111, 112 encoded in the first layer 11. The set of second data may for example be representative of amplitude modulation and/or frequency modulation.

According to an exemplary embodiment, metadata may be associated with each base signal 111, 112 and may be encoded into the first layer 11 with the first data (and with the third data when encoded into the first layer). For example, the metadata comprises an information representative of the length of each base signal, the length being expressed according to the determined space (e.g., the length corresponds to a duration when the space corresponds to a temporal space or the length corresponds to a distance when the space corresponds to a spatial space) and an information representative of a starting point in the determined space, the starting point being defined with an abscissa in the determined space.

First and optionally third data may for example be comprised or transported into bands having each a determined bandwidth, e.g., a bandwidth equal to 70, 100, 500, 1000 Hz. The number of frequency bands may for example be comprised between 2 and 9 or between 1 and any number of frequency bands. Each band comprises for example a part of the data representative of the haptic effect to be rendered, the whole haptic effect being for example rendered by combining (e.g., summing) all the bands.

According to a first particular embodiment corresponding to the encoding of quantized-based haptic data, the first layer comprises:

a first band comprising first data representative of representative of a plurality of points (or keyframes) for amplitude modulating the single constant signal stored in the rendering engine, the third data representative of this single constant signal being not encoded in the bitstream; the length (in the representation space) of the modulation corresponds to the length of the haptic signal to be rendered, e.g., 65 s; and one or more second bands each comprising first data representative of modulation points (or keyframes) to be applied to one single base signal, third data representative of the single base signal being encoded into the second bands (the type of a base signal corresponding for example always to a sine signal); the length (in the representation space) of the base signal corresponds to the length of the haptic signal to be rendered, e.g., 65 s.

The data comprised in a band is representative of a melody.

According to a second particular embodiment corresponding to the encoding of vectorial-based haptic data, the first layer comprises:

a first band comprising data representative of an API (Application Programming Interface) call; and one or more second bands each comprising first data representative of modulation points (or keyframes) to be applied to one or more base signals, third data representative of each base signal being encoded into the second bands, the base signal being for example of any type and of any length.

The data comprised in a band is representative of a melody.

The second layer 12 comprises first information representative of a second set of one or more sequences 121, 122 of modulated signals. Each sequence 121, 122 comprises one or more modulated signals sequentially ordered in the determined space within the sequence.

A modulated signal corresponds to a base signal 111, 112 encoded in the first layer onto which has been applied the modulation defined by the first data, except for the example of the first band for the encoding of quantized-based haptic data. The modulated signal corresponds to the result of the modulation applied to the associated base signal.

Amplitude modulation is obtained by multiplying the modulation function obtained by interpolating the points encoded with the first data by the base signal.

Frequency modulation may for example be obtained by using linear chirp.

First information is associated with each sequence of modulated signals comprised in the second layer 12. The first information encoded in the second layer 12 and associated with each sequence represents advantageously the sequential order of the one or more modulated signals comprised in the sequence and forming the sequence.

The first information is for example encoded using the syntax and/or the structure of the haptic effect file or codec. The sequential order of the modulated signals forming a sequence is for example obtained by coding the elements relative to the modulated signals in relation with the sequence they belong to and in an order that corresponds to the sequential order of each modulated signal. At decoding stage, the first information is implicitly derived from the syntax and/or the structure of the haptic effect file or codec.

According to a variant, the first information corresponds to explicit data or information identifying and pointing to each modulated signal that is encoded with the first and third data representative of the modulation parameters and associated base signal, respectively.

According to an exemplary embodiment, metadata may be associated with each sequence 121, 122 and may be encoded into the second layer 12 with the first information. For example, the metadata comprises an information representative of the length of each sequence (expressed according to the determined space), information representative of body part(s) onto which the haptic effect represented by the sequence is to be applied, information representative of a volume.

The third layer 13 comprises second information representative of a third set of one or more first combinations 131, 132 of one or more sequences 121, 122 of modulated signals. Each first combination 131, 132 correspond to a group of one or more sequences encoded in the second layer, which are combined according to a specific function (sum, weighted sum, filtering, average sum, compression).

Second information is associated with each first combination of sequences comprised in the third layer 13. The second information encoded in the third layer 13 and associated with each first combination represents advantageously the number of sequence(s) forming each first combination 131, 132.

The second information is for example encoded using the syntax and/or the structure of the haptic effect file or codec. The number of sequences comprised in a first combination is for example obtained by coding the elements relative to the sequences in relation with the first combination they belong to. At decoding stage, the second information is implicitly derived from the syntax and/or the structure of the haptic effect file or codec.

According to a variant, the second information corresponds to explicit data or information identifying and pointing to each sequence that is encoded with the data representative of the first combination.

According to an exemplary embodiment, metadata may be associated with each first combination 131, 132 and may be encoded into the third layer 13 with the second information. For example, the metadata comprises an information representative of the addressed perception type associated with the haptic feedback (e.g., vibration, force feedback, temperature perception, stiffness, texture), information representative of body part(s) targeted by the haptic feedback or effect represented by the first combination, information representative of a volume.

The fourth layer 14 comprises third information representative of a second combination 141 of one or more first combination 131, 132 encoded in the third layer 13. The second combination 141 correspond to a group of first combinations encoded in the third layer 13, which are to be encoded together to form the second combination 141.

The second combination corresponds to the haptic file representative of the haptic effect or feedback that is encoded in the haptic effect file or codec.

The third information represents advantageously the number of first combinations forming the second combination 141.

The third information is for example encoded using the syntax and/or the structure of the haptic effect file or codec. The number of first combinations comprised in the second combination is for example obtained by coding the elements relative to the first combinations in relation with the second combination they belong to. At decoding stage, the third information is implicitly derived from the syntax and/or the structure of the haptic effect file or codec. According to a variant, the third information corresponds to explicit data or information identifying and pointing to each first combination that is encoded with the data representative of the second combination.

According to an exemplary embodiment, metadata may be associated with the second combination 141 and may be encoded into the fourth layer 14 with the third information. For example, the metadata comprises an information representative of body part(s) onto which the haptic effect represented by the second combination is to be applied, information representative of a rendering method.

The second data relative to the haptic perception modality associated with the haptic effect to be rendered is advantageously encoded into the second layer 12, the third layer 13 or the fourth layer 14, for example as a metadata.

The haptic perception modality corresponds to the type of the haptic effect or haptic feedback to be rendered. Haptic perception modality corresponds for example to one of the following:

- vibrotactile effect;
- force effect;
- stiffness;
- texture;
- temperature.

The space of representation of the one or more base signals used to encode the haptic signal to be rendered is dependent from the haptic perception modality. For example, vibrotactile and force are associated with the temporal space while stiffness and texture are associated with a spatial space.

According to an exemplary embodiment, the metadata encoded into the first layer 11, the second layer 12, the third layer 13 or the fourth layer 14 comprises data representative of one or more API ("Application Programming Interface") call, one single API call being associated with one single base signal. An API call associated with a base signal may be encoded under the form of:

- an identifier identifying an API call stored in a memory of the rendering engine; or
- a set of instructions to be executed by the rendering engine.

Use of the API instead of the base signal(s) is determined by the rendering engine based on the existence of the communication channel (between the rendering engine and the haptic device (actuator)) able to process the API call.

FIG. 2 shows data representative of a haptic signal encoded into a haptic effect file 2 having a hierarchical text format, in accordance with at least one exemplary embodiment.

According to an exemplary embodiment, the haptic signal is encoded under the form of a JSON-compliant file or codec 2 according to the hierarchical structure or representation 100. FIG. 2 illustrates an example of such a JSON-file 2, for illustration purpose only.

A block 21 of elements (also called "keys" or "tags") "m_version", "m_description", "m_HDFlag", "m_time_unit", "m_length_unit", "m_volume", "m_stiffness", and "m_texture" of the JSON-file comprises metadata and associated values of the second combination representing the haptic signal encoded into the fourth layer 14.

The second combination comprises only one first combination identified with a block 22 of elements introduced by the element "m_vibration". The first combination is coded in the JSON-file at a hierarchical level that is lower than the hierarchical level of the second combination, identified with and comprised between the symbols "{" and "}". The elements "m_loop", "m_maximum", "m_speed", "m_volume" and "m_signalEvaluationMethod" of the JSON-file correspond to metadata and associated values of the first combination encoded into the third layer 13.

The first combination identified with the element "m_vibration" comprises only one sequence of modulated signals, which is identified with the element "m_melodies". The sequence is coded in the JSON-file at a hierarchical level that is lower than the hierarchical level of the first combination. A block 23 of elements "m_maximum", "m_mute" and "m_volume" of the JSON-file following the element "m_melodies" correspond to metadata and associated values of the sequence of modulated signals encoded into the second layer 12.

Finally, the sequence identified with the element "m_melodies" comprises two modulated signals 24, 25, which are sequentially coded in the JSON-file at a hierarchical level that is lower than the hierarchical level of the sequence "m_melodies".

The modulated signals 24, 25 forming the sequence "m_melodies" are defined or coded with elements following the element "m_notes" in the JSON-file and comprised between the symbols "[" and "]".

The data representative of the first modulated signal 24 of the sequence are encoded or signaled first in the "m_note" block of elements in the JSON-file followed by the data representative of the second modulated signal 25 (following sequentially the first modulated signal). According to this non-limitative example, the second information representative of the sequential order of each modulated signal of the sequence is obtained from the hierarchical structure of the JSON-file itself, the elements defining the modulated signal being attached to or associated with the sequence, the second modulated signal 25 following the first one 24.

Each modulated signal 24, 25 comprises metadata encoded in the first layer 11 with the first and third data. A first metadata is identified or signaled with the element "m_length" corresponding to the length of the modulated signal (or similarly to the length of the base signal used to obtain the modulated signal) and a second metadata is identified with the element "m_startingPoint" corresponding to the origin of the modulated signal in the determined space (the origin or starting point of a modulated signal corresponds for example to a time on a timeline or on a position on space line, depending on the space into which the base signal is represented).

Each modulated signal 24, 25 is encoded or signaled in the JSON-file with third data 241, 251 representative of a base signal identified with the element "m_underlyingSignal" in the JSON-file and with first data 242, 252 representative of modulation parameters identified with the element "m_amplitudeModulation" in the JSON-file.

Regarding the first modulated signal 24, the base signal is characterized or signaled in the JSON-file by third data 241 comprising the type of the base signal (identified with the element "m_signalType", which has the value 0 that corresponds for example to a sinusoidal signal), the phase of the base signal (identified with the element "m_phase"), the amplitude of the base signal (identified with the element "m_amplitude"), the frequency of the base signal (identified with the element "m_frequency") and a vertical offset of the base signal (identified with the element "m_verticalOffset").

The first data 242 representative of the modulation to be applied to the base signal is identified or signaled with the element "m_amplitudeModulation") that indicates that the modulation to be applied to the base signal is an amplitude modulation. A metadata identified or signal with the element "m_max" is associated with the modulation.

Two points or keyframes are then encoded or signaled in the JSON-file under the element "m_amplitudeModulation", each point being characterized or signaled with a set of first data comprising the coordinates of the point (identified with the element "m_time" corresponding to the abscissa and the element "m_value" corresponding to the ordinate) and other parameters that depend for example on the type of interpolating function to be used.

The interpolating function to be used at decoding and/or rendering stage corresponds for example to a default interpolating function (e.g., a three-order polynomial function), known a priori by the encoder, the decoder and the rendering engine, with no need to identify the default function in the JSON-file.

According to a variant, the interpolating function is a specific interpolation function identified in the JSON-File (with an identifier or with parameters), for example as metadata associated with the modulation in a higher level.

Regarding the second modulated signal 25 (encoding following the first modulated signal 24 in the JSON-file), the base signal is characterized or signaled in the JSON-file by third data 251 similar or identical to the third data of the first modulated signal.

The first data 252 representative of the modulation to be applied to the base signal is identified or signaled with the element "m_amplitudeModulation") that indicates that the modulation to be applied to the base signal is an amplitude modulation.

The first data 252 of the second modulated signal 25 is representative of a function that is identified or signaled with the same elements as a base signal in this specific example.

Figure 3:
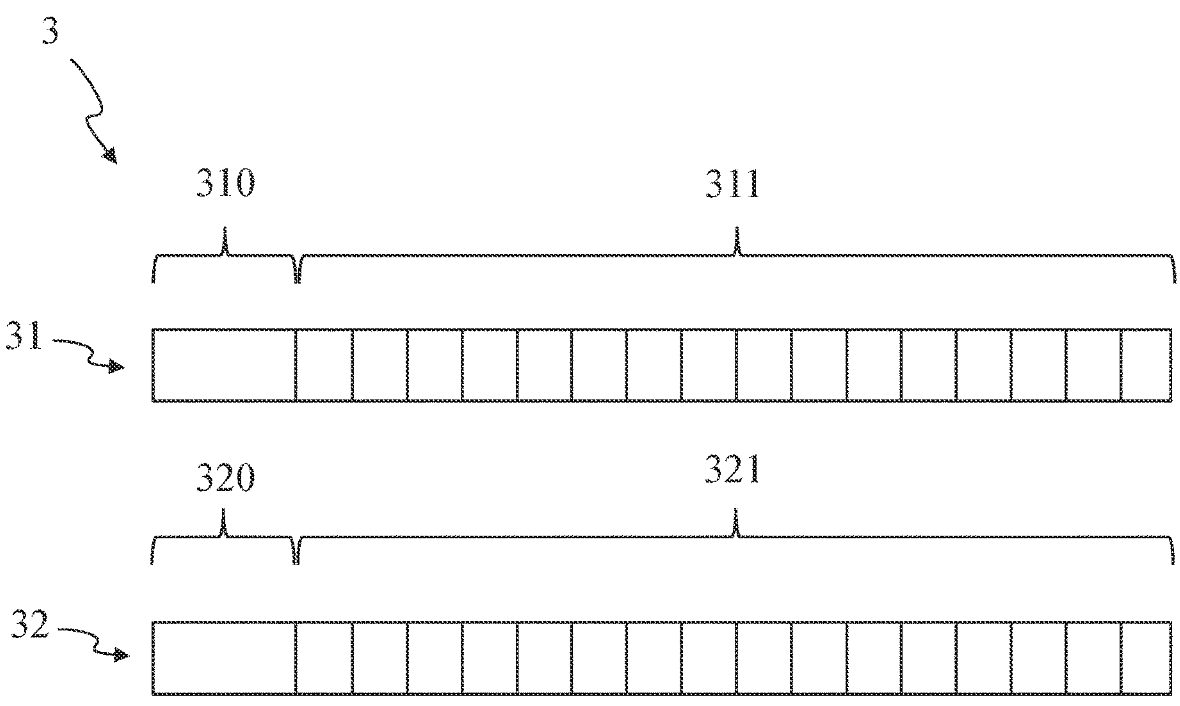
FIG. 3 shows data representative of a haptic signal encoded into a haptic effect file having a binary format, in accordance with at least one exemplary embodiment.

FIG. 3 shows data representative of a haptic signal encoded into a haptic effect file 3 having a binary format, in accordance with at least one exemplary embodiment.

According to a second exemplary embodiment, the haptic signal is encoded under the form of one or more strings 31, 32 of binary elements or characters according to the hierarchical structure or representation 100.

Each string 31, 32 of binary elements comprises for example a header 310, 320 respectively and payload data 311, 321 respectively. The header has advantageously hierarchical level higher than the payload data, the header comprising the second data representative of the haptic perception modality associated with the haptic signal encoded into the strings 31, 32.

According to a non-limitative example, a string comprised data representative of one first combination, i.e., the string 31 comprises data representative of a first combination and the string 32 comprises data representative of another first combination, both strings 31, 32 (i.e., both first combinations) forming the second combination corresponding to the haptic material of the haptic signal.

The header 310, 320 of each string 31, 32, respectively, comprises fields each comprising a value associated with a variable or a parameter corresponding to the third information and metadata associated with the second combination, the second information and metadata associated with the first combination of sequences and to the first information and metadata associated with the sequences of modulated signals forming the first combination.

The payload 311, 321 of each string 31, 32, respectively, comprises fields each comprising a value associated with a variable or a parameter corresponding to the modulating signals forming the first combination described by the data of each string 31, 32.

The data (i.e., first and second data) describing each modulated signal is encoded sequentially into the payload 311, 321 of the strings 31, 32 respectively, sequence after sequence.

The end of a sequence of modulated signals is for example signaled in the payload 311, 321 with a special character, the following sequence starting after said special character. The special character is for example noted E_O_B and coded with the hexadecimal value '00FFFF'.

According to another example, an amplitude equal to 0 may be interpreted as the special character when positioned at the end of the sequence.

According to a particular embodiment, the end of a series of modulated signal is signaled in the payload 311, 321 with a special character noted E_O_S and coded with the value '00". A series of modulated signals correspond to a plurality of modulated signal sharing some identical parameters (for example a same phase or a same amplitude for the base signals used to obtain the associated modulated signals), identical parameters being coded once for the series.

Such a format enables to encode vectorial-based haptic data and quantized-based haptic data. When the data is vectorial, this information is for example encoded in the header with a boolean coded on 1 bit ('0' for FALSE and '1' for TRUE for example). It enables the encoding of vectorial structures like IVS and AHAP formats with the hierarchical representation 100.

Such a format also enables to encode specific signals like transient or API call, the data of which being serially encoded in the payload and signaled in the header.

According to an embodiment, the haptic signal is encoded under the form of a single string of binary elements or characters according to the hierarchical structure or representation 100. According to this embodiment, the end of a first combination is signaled in the stream with a determined special character, the field or character following this special character corresponding to the first character or field of another first combination of one or more sequences of modulated signals.

The proposed hierarchical encoding presents various advantages over the existing encoding formats of the prior art, such as:

- Ability to encode both continuous and vibrotactile tactile signals with the same encoding in the same haptic perception, corresponding to a first combination of one or more sequences of modulated signals; and/or
- Ability to encode both spaces based and time-based tactile signals with the same encoding; and/or
- Ability to encode both kinesthetic in spatial and time-based approach;
- Ability to modulate independently the modulating functions of different base signals, sequences of modulated signals, and first combination(s) of one or more sequences at run time; and/or
- Ability to transcode AHAP format and/or IVS starting from the proposed hierarchical encoding format; and/or
- Ability to transcode IVS format starting from the proposed hierarchical encoding format.

Conversion Between Different Files Format

The proposed hierarchical format as well as the format AHAP from Apple and IVS from Immersion corporation encodes haptic signals vectorially, which means that "drawing commands" are stored to generate a signal in place of the signal itself. By this supposition, a 1 to 1 matching of these 3 files format may be extrapolated to create a translator which will have the goal to convert AHAP file or IVS file one into a file according to the hierarchical format of the present disclosure.

For example, regarding the AHAP data format, it is known that continuous parts have:

- A sharpness between 0 and 1 is a range of frequency between 65 Hz and 300 Hz (experimental results);
- An intensity between 0 and 1 and the feedback amplitude result going to the maximum value possible of the device; and
- A starting time and a duration in seconds.

There is a direct match between these continuous and the modulated signals proposed in the hierarchical format which both store the same information.

Transients are stored at a specific time with intensity and sharpness (which may correspond to the frequency of the signal). Transients may be matched with a new modulated signal containing one or more periods at high frequency and a high amplitude to represent this shock if the signal length is short enough. It's also possible to encode it with key-frames (representing the peaks of the transient) or with points only representative of the modulation to be applied to a continuous base signal. Transients may also be stored as an API call. The modulation function will also be a direct match between the proposed hierarchical format and the AHAP format. The audio information stored in the file cannot be translated inside the present hierarchical format but can be managed by the application itself which will play both files in two different players: one for the audio and the other for the haptic.

In the same idea, IVS files have this 1 to 1 matching with the proposed hierarchical format. Both encode a starting time, a duration, a frequency (IVS stores a window length in milliseconds which can be directly converted in frequency:

$$f = \frac{1}{T}),$$

an amplitude and a modulation amplitude for each modulated signal. The main difference here is the possibility to create loops inside the IVS file's timeline. But it can be translated into a simple duplication of the content inside this loop N times corresponding to the count number of this same loop. IVS store also the wave type inside the format which is directly matched to the present proposed hierarchical format.

The MagSweep effect can be interpreted as a normal modulated signal but will be driven by a constant frequency which can be given by the developer. During an experimental testing phase, it has been discovered that this effect was synthesized with a frequency of 170 Hz.

Finally, the last type is the waveform which can be as well encoded as keyframes inside the proposed hierarchical format or a sound analysis can be performed on the file to encode it as a frequency bank inside the file. The multimedia integration can be the same as the AHAP one.

Figure 4:
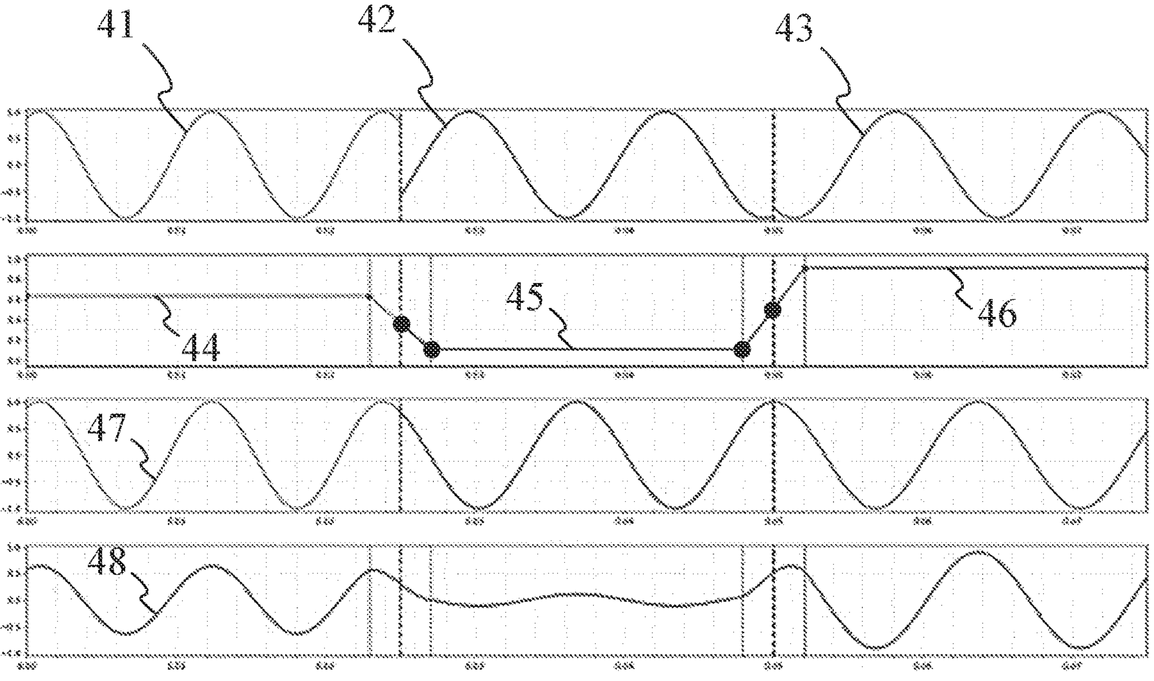
FIG. 4 shows a sequence of base signals encoded according to the hierarchical representation of FIG. 1, in accordance with at least one exemplary embodiment.

FIG. 4 shows a sequence of modulated signals obtained from base signals and encoded according to the hierarchical representation of the present disclosure, in accordance with at least one exemplary embodiment.

FIG. 4 illustrates a sequence 48 of modulated signals obtained from base signals 41, 42, 43 modulated according to a determined modulation.

According to the non-limitative example of FIG. 4, each base signal 41, 42, 43 corresponds to a sine having each a specific frequency (for example 87 Hz for the first base signal 41, 76 Hz for the second base signal 42 and 73 Hz for the third base signal 43), the amplitude of which varying over time. The amplitude is for example comprised between a maximum equal to 1 and a minimum equal to −1. The representation space of the base signals corresponds to the time, the abscissa of the representation space of the base signals 41, 42, 43 corresponding to a timeline.

The base signal 41 starts at time 0, the base signal 42 starts at time 0.025 s and the base signal 43 starts at time 0.05.

According to the exemplary embodiment of FIG. 4, base signals 41 to 45 have a same duration, with no gap between the end of a signal and the start of the following signal.

Modulation parameters of each base signal 41, 42, 43 are represented with specific functions 44, 45, 46 respectively. The modulation function 44 associated with the first signal 41, the modulation function 45 associated with the second base signal 42 and the modulation function 46 associated with the third base signal 43 are represented on the same timeline as the timeline of the base signals 41 to 43.

Each modulation function 44, 45, 46 is represented with points or keyframes, illustrated with dark bold notes for the second modulation function 45. Each modulation function 44, 45, 46 corresponds for example to a parametric function, the parameters of the parametric function encoded in the haptic effect file corresponding to the points of keyframes.

According to the exemplary embodiment of FIG. 4, 4 points are used to encode the parameters of the modulation function. Naturally, the number of points may be different from 4, the number of points taking for example any value comprised between 1 point and 20, 50 or 100 points, depending for example on the length of the base signal. The number of points may be even equal to 0, which will be interpreted as no modulation function.

The signal 47 represents the sequence of base signals 41 to 43 that have been phase adjusted thanks to the phase information associated with each base signal 41 to 43 and encoded into the first layer of the haptic effect file.

Finally, the signal 48 represents the sequence obtained from the sequentially ordered base signals 41 to 43 that have been modulated in amplitude according to the parametric modulation functions 44, 45, 46 represented with their corresponding points or keyframes.

The number of base signals is not limited to 3 but extends to any number, for example 1, 2, 5, 10 or more base signals.

The type of the base signals is not limited to a sinusoidal function but extends to any types of base signal, for example a constant signal (having a fixed amplitude over time or space depending on the representation space of the signals), a triangular signal, a rectangular signal, etc. A sequence of a plurality base signals may comprise base signal of different types, for example a continuous signal followed by a sine followed by a triangular, with optionally gaps between successive base signals.

Figure 5:
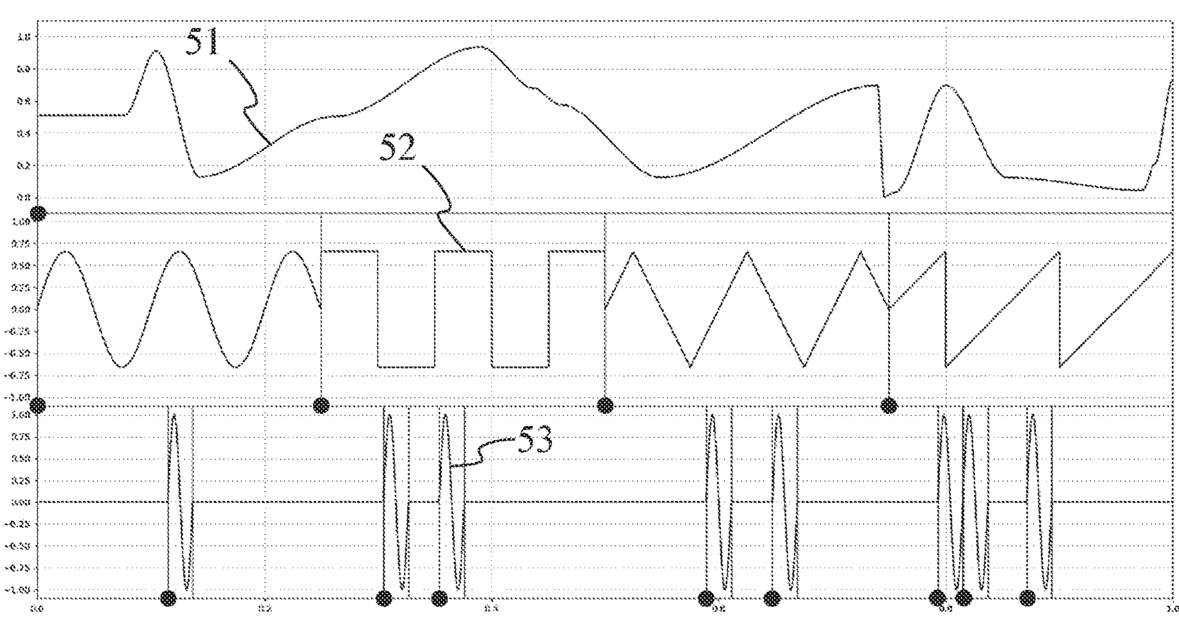
FIG. 5 shows exemplary sequences of modulated base signals encoded according to the hierarchical representation of FIG. 1, in accordance with at least one exemplary embodiment.

FIG. 5 shows exemplary sequences of modulated base signals encoded according to the hierarchical representation of the present disclosure, in accordance with at least one exemplary embodiment.

FIG. 5 illustrates 3 different sequences of one or more modulated signals obtained by modulating one or more base signals.

The first signal 51 corresponds to a sequence obtained by applying an amplitude modulation to a single continuous and constant signal (for example with a fixed amplitude over time), the amplitude modulation being encoded with a parametric modulating function being obtained by interpolating a plurality of points or key frames used as parameters of the parametric functions. The number of points or key frames encoded in the haptic effect file as second data is for example equal to 15.

The starting point of the first signal 51 illustrated with the black bold point is advantageously encoded with the first data representative of the continuous base signal.

The second signal 52 corresponds to a sequence obtained by applying an amplitude modulation to each base signal of the sequence of 4 base signals, without phase adjustment between the different base signals. According to this example, the first base signal corresponds to a sinusoidal function with determined amplitude and frequency, the second base signal corresponds to a rectangular signal with determined amplitude and frequency, the third base signal corresponds to a triangular signal with determined amplitude and frequency and the fourth base signal corresponds to a sawtooth signal with determined amplitude and frequency. The starting point of each base signal (and consequently of each modulated signal obtained from each base signal) is illustrated with a black bold point and is advantageously encoded with the first data representative of each base signal.

Finally, the third signal 53 to a sequence obtained from a sequence of 8 base signal each corresponding to a transient encoded as an API call associated with the base signals encoded into the first layer. As can be seen from FIG. 5, the sequence of the 8 signals is not continuous, gaps appearing between two successive signals of the sequence 53. The gaps are obtained directly from the starting point of each of the 8 signals encoded in the first layer of the hierarchical representation. API calls are for example represented and synthesized by a sine function with only one period during 22 ms.

The hierarchical encoding disclosed in the present application enables to encode any feedback effect, in space, time or any representation space as a sequence of one or more base signals and associated modulation parameters.

Figure 6:
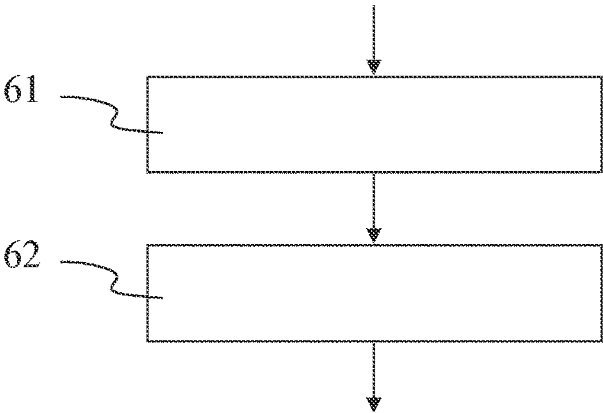
FIG. 6 shows a schematic block diagram of steps of a method of encoding a haptic signal according to the hierarchical representation of FIG. 1, in accordance with at least one exemplary embodiment.

FIG. 6 shows a schematic block diagram of steps of a method of encoding a haptic signal according to the hierarchical representation 100, in accordance with at least one exemplary embodiment.

In a first step 61, first data representative of modulation of at least a base signal is encoded in a first layer of a plurality of layers having each an associated hierarchical level.

In a second step 62, second data representative of a haptic perception modality associated with the haptic effect associated with the haptic signal is encoded in a layer of the plurality of layers having a hierarchical level upper than a hierarchical level of the first layer.

According to a specific embodiment, the at least a base signal is comprised in a first set of base signals. Third data representative of each base signal of the first set is encoded in the first layer, in addition to the first data. Each base signal is represented in a determined representation space that is function of the haptic perception modality.

Figure 7:
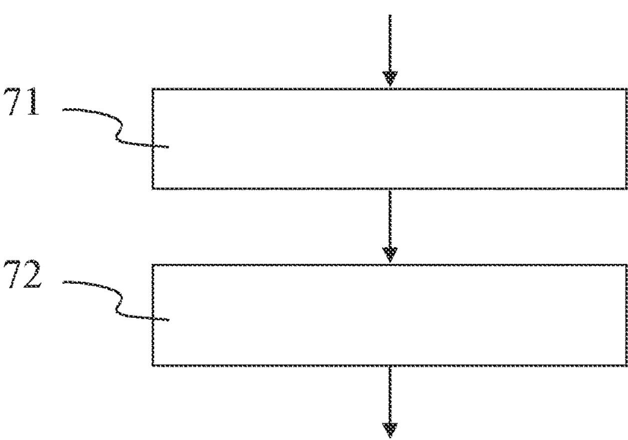
FIG. 7 shows a schematic block diagram of steps of a method of decoding haptic data encoded according to the hierarchical representation of FIG. 1, in accordance with at least one exemplary embodiment.

FIG. 7 shows a schematic block diagram of steps of a method of decoding haptic data encoded according to the hierarchical representation 100, in accordance with at least one exemplary embodiment.

In a first step 71, first data representative of modulation of at least a base signal is decoded from a first layer of a plurality of layers having each an associated hierarchical level.

In a second step 72, second data representative of a haptic perception modality associated with the haptic effect associated with the haptic signal is decoded from a layer of the plurality of layers having a hierarchical level upper than a hierarchical level of the first layer.

According to a specific embodiment, the at least a base signal is comprised in a first set of base signals. Third data representative of each base signal of the first set is decoded from the first layer, in addition to the first data. Each base signal is represented in a determined representation space that is function of the haptic perception modality.

Figure 8:
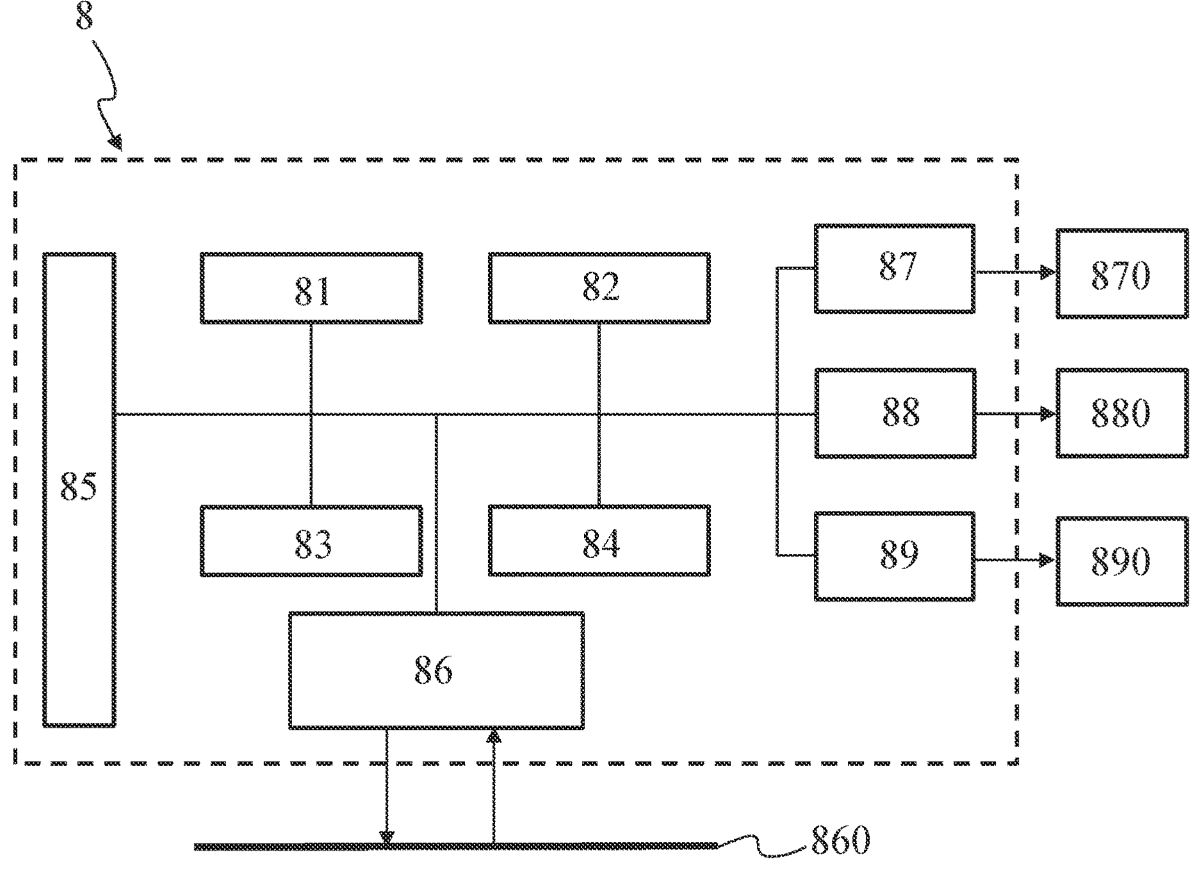
FIG. 8 illustrates a schematic block diagram of an example of a system in which various aspects and exemplary embodiments are implemented.

FIG. 8 shows a schematic block diagram illustrating an example of a system in which various aspects and exemplary embodiments are implemented.

System 8 may be embedded as one or more devices including the various components described below. In various embodiments, the system 8 may be configured to implement one or more of the aspects described in the present application.

Examples of equipment that may form all or part of the system 8 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), haptic sensors or actuators, "caves" (system including multiple displays), servers, haptic encoders, haptic decoders, post-processors processing output from a haptic decoder, pre-processors providing input to a haptic encoder, web servers, set-top boxes, wireless (e.g., Bluetooth®) connected wearable haptic devices, and any other device for processing haptic data or haptic signals, or other communication devices. Elements of system 8, singly or in combination, may be embodied in a single integrated circuit (IC), multiple ICs, and/or discrete components. For example, in at least one embodiment, the processing and encoder/decoder elements of system 8 may be distributed across multiple ICs and/or discrete components. In various embodiments, the system 8 may be communicatively coupled to other similar systems, or to other electronic devices, via, for example, a communications bus or through dedicated input and/or output ports.

The system 8 may include at least one processor 81 configured to execute instructions loaded therein for implementing, for example, the various aspects described in the present application. Processor 81 may include embedded memory, input output interface, and various other circuitries as known in the art. The system 8 may include at least one memory 82 (for example a volatile memory device and/or a non-volatile memory device). System 8 may include a storage device 84, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 84 may include an internal storage device, an attached storage device, and/or a network accessible storage device, as non-limiting examples.

The system 8 may include an encoder/decoder module 83 configured, for example, to process data to provide encoded/decoded haptic signal or data, and the encoder/decoder module 83 may include its own processor and memory. The encoder/decoder module 83 may represent module(s) that may be included in a device to perform the encoding and/or decoding functions. As is known, a device may include one or both of the encoding and decoding modules. Additionally, encoder/decoder module 83 may be implemented as a separate element of system 83 or may be incorporated within processor 81 as a combination of hardware and software as known to those skilled in the art.

Program code to be loaded onto processor 81 or encoder/decoder 83 to perform the various aspects described in the present application may be stored in storage device 84 and subsequently loaded onto memory 82 for execution by processor 81. In accordance with various embodiments, one or more of processor 81, memory 82, storage device 84, and encoder/decoder module 83 may store one or more of various items during the performance of the processes described in the present application. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 81 and/or the encoder/decoder module 83 may be used to store instructions and to provide working memory for processing that may be performed during encoding or decoding.

In other embodiments, however, a memory external to the processing device (for example, the processing device may be either the processor 81 or the encoder/decoder module 83) may be used for one or more of these functions.

The external memory may be the memory 82 and/or the storage device 84, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-V.

The input to the elements of system 8 may be provided through various input devices as indicated in block 85. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 85 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 8 to other electronic devices across USB and/or HDMI connections. It is to be understood that various aspects of input processing, for example, Reed-Solomon error correction, may be implemented, for example, within a separate input processing IC or within processor 81 as necessary. Similarly, aspects of USB or HDMI interface processing may be implemented within separate interface ICs or within processor 81 as necessary. The demodulated, error corrected, and demultiplexed stream may be provided to various processing elements, including, for example, processor 81, and encoder/decoder 83 operating in combination with the memory and storage elements to process the data stream as necessary for presentation on an output device.

Various elements of system 8 may be provided within an integrated housing. Within the integrated housing, the various elements may be interconnected and transmit data therebetween using suitable connection arrangement 85, for example, an internal bus as known in the art, including the I2C bus, wiring, and printed circuit boards.

The system 8 may include communication interface 86 that enables communication with other devices via communication channel 860. The communication interface 86 may include, but is not limited to, a transceiver configured to transmit and to receive data over communication channel 860. The communication interface 86 may include, but is not limited to, a modem or network card and the communication channel 860 may be implemented, for example, within a wired and/or a wireless medium.

Data may be streamed to the system 8, in various embodiments, using a Wi-Fi network such as IEEE 802.11. The Wi-Fi signal of these embodiments may be received over the communications channel 860 and the communications interface 86 which are adapted for Wi-Fi communications. The communications channel 860 of these embodiments may be typically connected to an access point or router that provides access to outside networks including the Internet for allowing streaming applications and other over-the-top communications.

Other embodiments may provide streamed data to the system 8 using a set-top box that delivers the data over the HDMI connection of the input block 85.

Still other embodiments may provide streamed data to the system 8 using the RF connection of the input block 85.

The streamed data may be used as a way for signaling information used by the system 8. The signaling information may comprise the data encoded in a binary stream obtained from the haptic effect file 2 or 3 for example.

It is to be appreciated that signaling may be accomplished in a variety of ways. For example, one or more syntax elements, flags, and so forth may be used to signal information to a corresponding decoder in various embodiments.

The system 8 may provide an output signal to various output devices, including a display 870, speakers 880, and other peripheral devices 890 like haptic devices/actuators.

In various embodiments, control signals may be communicated between the system 8 and the display 870, speakers 880, or other peripheral devices 890 using signaling such as AV.Link (Audio/Video Link), CEC (Consumer Electronics Control), Audio protocols, USB (Universal Serial Bus), HIF UHP (Haptic Industry Forum-Universal Haptic Protocol) or other communications protocols that enable device-to-device control with or without user intervention. The output devices may be communicatively coupled to system 8 via dedicated connections through respective interfaces 87, 88, and 89.

Alternatively, the output devices may be connected to system 8 using the communications channel 860 via the communications interface 86. The display 870, speakers 880 and/or actuators 890 may be integrated in a single unit with the other components of system 8 in an electronic device such as, for example, a television.

In various embodiments, the display interface 87 may include a display driver, such as, for example, a timing controller (T Con) chip.

The display 870 speakers 880 and/or actuators 890 may alternatively be separate from one or more of the other components, for example, if the RF portion of input 85 is part of a separate set-top box. In various embodiments in which the display 870, speakers 880 and/or actuators 890 may be external components, the output signal may be provided via dedicated output connections, including, for example, HDMI ports, USB ports, or COMP outputs.

Figure 9:
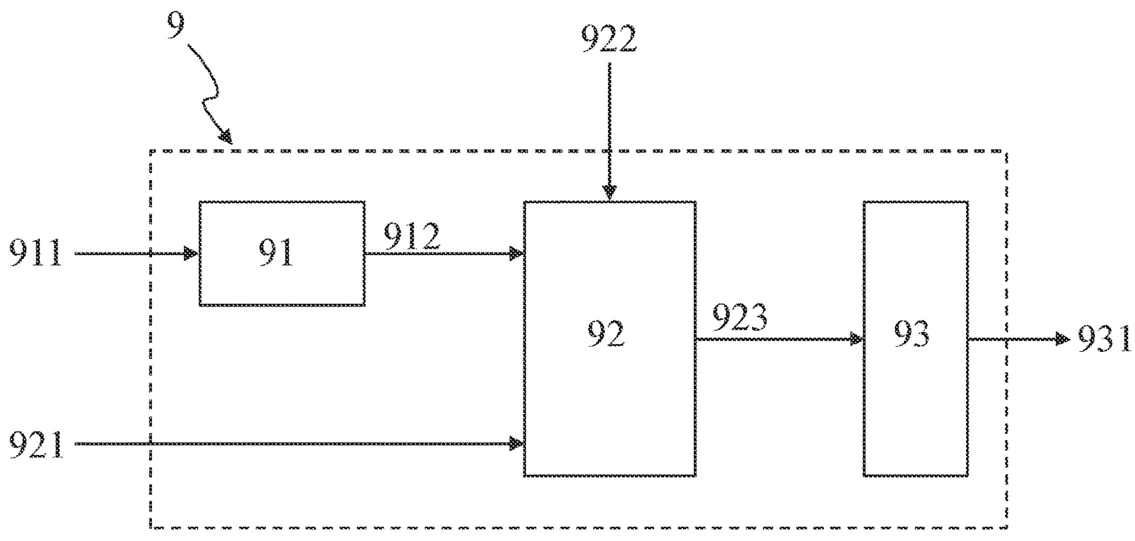
FIG. 9 shows a schematic block diagram of an example of a rendering system and corresponding method of rendering one or more haptic effects, in accordance with at least one exemplary embodiment.

FIG. 9 shows a schematic block diagram of an example of a rendering system and method of rendering one or more haptic effects, in accordance with at least one exemplary embodiment.

Haptic effects may be rendered as a function of space or time and any independent system variable. A unified rendering solution should render the best haptic despite the quality and value of the input and the communication capability of the output device. Such a rendering process requires the uniformization of the independent variable input, as well as the ability to accord the output value to the connected device.

One of the prior art methods to render haptic in space is based on a map of expected haptic values. The comparison of these maps of value with the input acquisition position and the rendering of the haptic is based on this method. The drawback of this method is the necessity to have an extremely precise and rapid position acquisition system to match the perceptual bandwidth of humans. Here is an example:

V=10 cm/s: velocity of the body part in contact with the haptic display;

F=1000 Hz: maximum human perceptual bandwidth;

Minimum distance of perceived haptic elements: 0.1 $m \cdot s^{-1}/1000\ s^{-1}=0.0001$ m=100 microns.

The acquisition system should be able to acquire the position of the finger with a precision less than 100 microns and at least at 1 KHz to be able to render a spatial haptic texture. Commercial position acquisition systems embedded in consumer devices acquire the human position between 30 and 120 Hz. The result is that this rendering method does not allow a satisfactory rendering of haptic signals due to signal acquisition noise, and low acquisition frequency.

Each block of the diagram 9 is to be interpreted as an element or a unit of a system and as corresponding operations implemented by the element or unit. The rendering system and associated implemented method 9 aims at overcoming at least one disadvantage of prior art systems.

System 9 may be embedded as one or more devices including the various components of system 8 described in reference to FIG. 8. System 9 corresponds for example to a haptic rendering engine. System 9 is configured to render one or more haptic effects from encoded data representative of the haptic effect(s) to be rendered, the encoded data being received under the form of a data stream or of a bit stream. The received data stream or bit stream advantageously corresponds to the data stream obtained from the encoding process and method described hereinabove in reference to FIGS. 1 to 5.

In a first block 91, data 911 representative of positions of at least a part of the body of a user is received from an acquisition device or system. The data 911 is acquired by the acquisition device at a determined frequency, for example at a frequency comprised between 30 and 120 Hz.

The first block 91 is configured to upsample or interpolate the positions represented by the data 911. The first block 91 outputs data 912 representative of the upsampled positions of the at least a part of the body.

The level of upsampling depends for example on the characteristics of the one or more haptic rendering devices (actuators) controlled by the system 9.

According to another example, the level of upsampling is fixed and stored as parameter in a memory of the system 9.

The upsampling is obtained by implemented any method known by those skilled in the art. For example, such a method is described in patent document WO2018/202609 published on 8 Nov. 2018.

Figure 10:
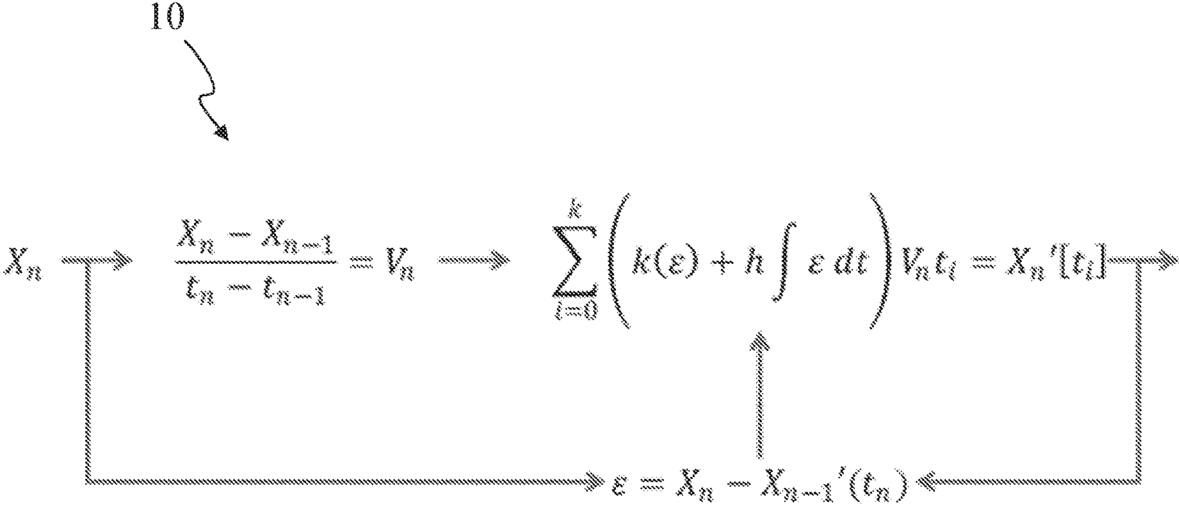
FIG. 10 shows a position upsampling method, in accordance with an exemplary embodiment.

FIG. 10 illustrates an exemplary embodiment of an upsampling algorithm.

$X_n$ corresponds to a position acquisition vector obtained from an acquisition device at each application cycle.

A velocity vector $V_n$ is computed from acquired position vectors $X_n$ and $X_{n-1}$ acquired at times $t_n$ and $t_{n-1}$ respectively.

A stabilized position vector $X'_n$ is computed after compensated velocity integration calculated for a series of times $t_i$ for i=0 to k, with k an integer, according to a positional error & computed at each frame and feedforwarded to the compensated velocity integration term of the equation for computing $X'_n$, k and h corresponding to control parameters to minimize $\varepsilon$.

In a second block 92, data 912 output by the first block 91 is received with data 921 representative of processor clock and rendering frequency.

The second block 92 also receives data 922 representative of the haptic signal to be rendered. The data 922 is for example received under the form of data encoded into one or more haptic effect files described according to the exemplary embodiments of FIGS. 1 to 5.

The second block 92 is configured to extract the data from the received data stream or bitstream, process the extracted data according to the type of haptic effect to be rendered (such information being obtained from the received data stream or bit stream) and optionally according to characteristics of the haptic rendering devices (actuators) controlled by the system 9 and connected to the system 9.

The layer(s) having the highest hierarchical level is (are) decoded first.

A haptic rendering model is for example selected among a plurality of haptic rendering models according to an information representative of a type (e.g., stiffness, texture, vibration, temperature) of the haptic effect or feedback to be rendered, such information corresponding for example to a data, or a metadata comprised in the datastream or bitstream, for example associated with a first combination encoded into the third layer.

The one or more characteristics of the haptic rendering device is for example received from the haptic rendering device connected in communication with the system 9. According to another example, an identifier of the haptic rendering device is received, the characteristics being for example retrieved from a LUT (Look-Up Table) stored in a memory of the system 9, the LUT associating the characteristics of each haptic device with an identifier of each haptic device.

The haptic rendering model processes the data comprised in the datastream or the bitstream of only a part of the data, for example according to the characteristics of the haptic rendering device intended to render the haptic effect.

For example, wideband haptic rendering device is configured to render complex haptic feedback or effect. In such a case, the whole haptic signal encoded in the datastream of bitstream is rendered by the haptic rendering model.

According to another example, some haptic rendering devices are only able to render simple haptic effect (for example only frequency dependent vibration).

In such a case, only the frequency part of the haptic signal encoded in the bitstream or datastream is rendered by the haptic rendering model.

The second data representative of the haptic perception modality associated with the haptic signal/haptic effect encoded into the bitstream is parsed and decoded before the first and third data.

If the actuator coupled to the rendering engine is not able/not configured to render the haptic effect indicated by the haptic perception modality encoded with the second data, the rendering engine does not decode all the bitstream as the actuator is not configured to render such a haptic effect.

If the actuator coupled to the rendering engine is able/configured to render the haptic effect indicated by the haptic perception modality encoded with the second data, the rendering engine decode at least part of the first and third data encoded into the bitstream, the part of first and third data that is decoded depending on the rendering capacities of the actuator.

Block 92 output data 923 representative of the haptic signal to be rendered to a block 93.

The block 93 is configured to process the data 923, for example according to the characteristics of the haptic rendering device connected to the system 9, more specifically to the block 93. Processing may comprise at least one of downsampling, haptic mixing, . . . .

System 9 and associated process enables, in combination with the datastream or bitstream according to the hierarchical format of the present disclosure, to render any kind of haptic effect, the use of the data comprised in the datastream or bitstream being adjusted to the characteristics and associated ability of the haptic rendering device.

Figure 11:
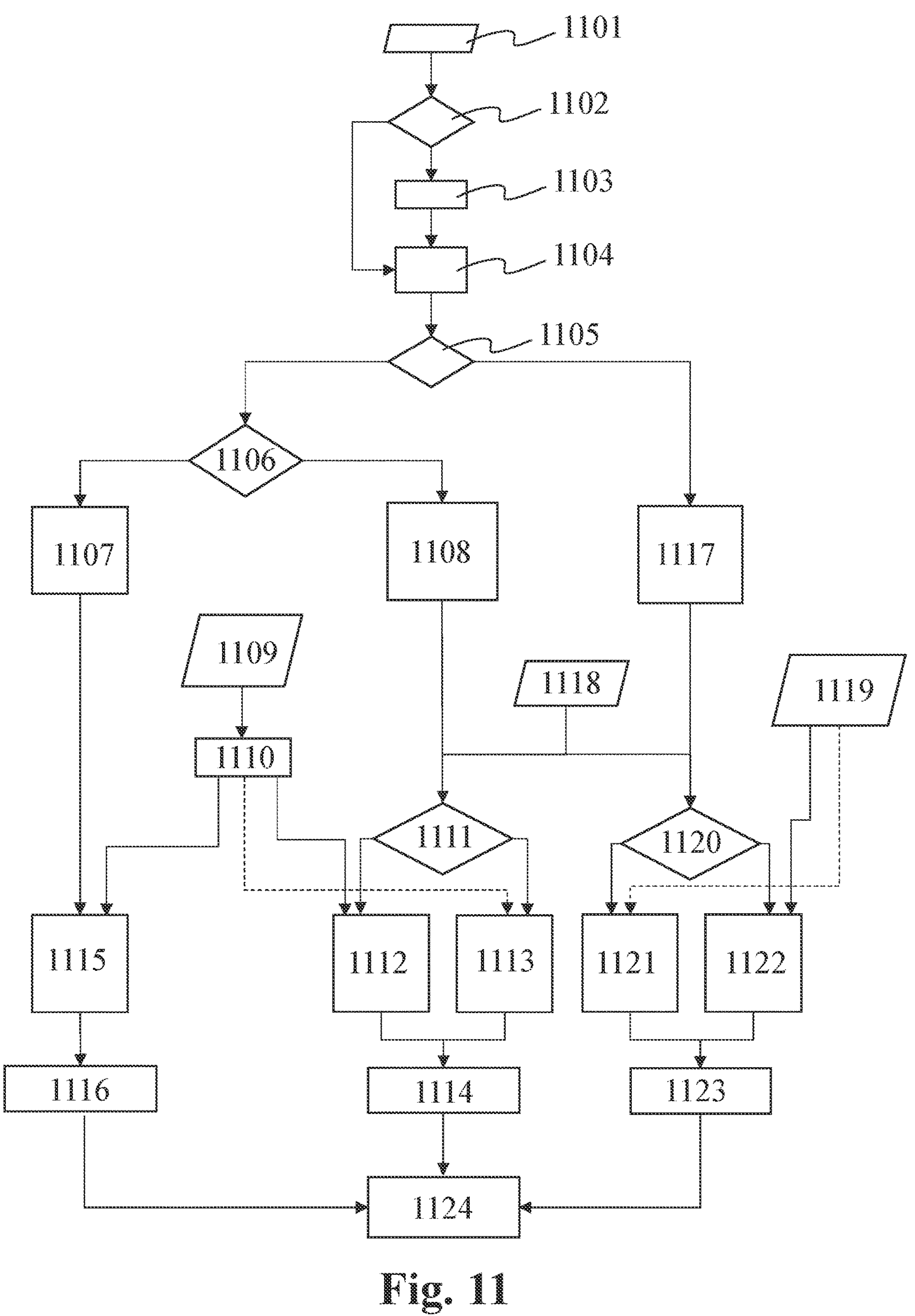
FIG. 11 shows a schematic block diagram of steps of a method of rendering one or more haptic effects, in accordance with at least one exemplary embodiment.

FIG. 11 shows a schematic block diagram of steps of a method of rendering one or more haptic effects, in accordance with at least one exemplary embodiment.

The method of FIG. 11 is for example implemented in the system 9.

In operation 1101, a stream of haptic data is received, for example from a memory or from a remote device via a wired or wireless connection.

In operation 1102, it is determined whether the stream of haptic data is in a format according to the hierarchical structure of the present disclosure, by analyzing the received data and/or by checking file extension and metadata. If yes, the method processes further with operation 1104. If no, the method processes further with operation 1103.

In operation 1103, i.e., when the format of the stream of haptic data is different from the hierarchical structure of the present disclosure, the stream of data received (for example according to AHAP or IVS format) is converted into the hierarchical format of the present disclosure.

In operation 1104, the haptic data is according to the hierarchical format of the present disclosure and the data is parsed or analyzed.

In operation 1105, it is determined whether the haptic data is time based, i.e., the representation space of the base signal(s) is determined. Such an information is for example obtained from the second data comprised in a layer of the hierarchical structure having a hierarchical level higher than the one of the first layer transporting the data representative of the base signals and associated modulation.

If the haptic data is time based, the method processes further with operation 1117.

If the haptic data is not time based, the method further processes with operation 1106.

In operation 1106, it is determined which type of haptic feedback is associated with the haptic data of the received data stream, e.g., whether the type of haptic feedback corresponds to a texture or to stiffness for example. Such an information is obtained from the second data and/or from metadata associated with the third layer, i.e., with the first combination of one or more sequences of modulated signals.

If the type of the haptic feedback corresponds to texture, then the method further processes with operation 1108.

If the type of the haptic feedback corresponds to stiffness, then the method further processes with operation 1107.

In operation 1107, modulation points or keyframes (corresponding to the modulation parameters) are extracted from the data stream, such information being encoded as first data associated with each base signal enabling to reconstruct the haptic effect.

In operation 1115, the modulation function is determined or calculated from the points (keyframes) extracted in operation 1107. The interpolation function corresponds for example to a polynomial function, for example a third-order polynomial function. The interpolation function may be any other function and may be signaled into the data stream to inform the rendering engine about which function to use. Points located between two keyframes are obtained through the interpolation function and the keyframes used as starting point and ending point of a section of the function.

The function obtained by interpolating the points (keyframes) encoded as first data with the interpolation function corresponds to the modulation function used to modulate the associated base signal encoded with the third data in the first layer.

The points located between two keyframes are further determined according to data representative of positions of a part of a body of a user experiencing the haptic effect, such data being obtained from the upsampling, in operation 1110, of data representative of positions of this part of the body received in operation 1109 from an acquisition device. The part(s) of the body targeted by the haptic effect(s) encoded into the data stream is (are) obtained from the data stream, such information being encoded as metadata in one or more of the layers of the data stream or bitstream.

In operation 1116, the stiffness haptic effect(s) is computed by modulating the base signal(s) with the modulation function(s) obtained at operation 1115. The sequence(s) of modulated signals are computed and combined according to the data encoded into the data stream and relative to the first and second combinations encoded into the third and fourth layers. The result of the computation is a haptic signal representative of the stiffness haptic effect to be rendered by the one or more actuators associated with the one or more body parts of the user targeted by the haptic effect.

The signal is transmitted to the actuator(s) for rendering at operation 1124.

In operation 1108, first and third data representative of the base signals and associated modulation are extracted from the bitstream or data stream, more specifically from the first layer of the hierarchical representation of the data encoded into the bitstream or data stream.

In operation 1111, it is determined whether the haptic rendering devices (i.e., the actuators) fed by the rendering engine is/are wideband devices from data representative of the characteristics of each of the haptic rendering devices obtained at operation 1118. Such data is for example obtained from the haptic devices or from a LUT (Look-Up Table) stored in a memory, the LUT associating the characteristics of each haptic device with an identifier of each haptic device.

In operation 1118, it is determined whether the haptic device(s) is (are) wideband or amplitude modulated only, the communication frequency, the range of signal communication and/or the expressive range for frequency (for example some actuators are configured to work from 65 to 300 Hz only).

If the haptic device(s) is (are) wideband device(s), the method processes further with operation 1112.

If the haptic device(s) is (are) not wideband device(s), the method processes further with operation 1113.

In operation 1112, the haptic device is capable of receiving a wideband signal and all modulated signals encoded with the first and third data into the first layer, for examples in one or more of the bands 2 to 9, are processed to obtain the sequences of modulated signals.

In operation 1113, the haptic device is not capable of receiving a wideband signal, meaning that the haptic device can receive only amplitude modulated signal. In such a situation, a constant signal (for example hardcoded in the rendering engine) is modulated with specific first data representative of modulation encoded in the first layer, for example the first data encoded in the first band described with regard to the embodiment relative to quantized-based haptic data.

Operations 1112 and 1113 enable to obtain texture haptic for a number N of application frames at operation 1114.

The signal is transmitted to the actuator(s) for rendering at operation 1124.

In operation 1117, the received haptic data being time based, first and third data representative of the base signals and associated modulation are extracted from the bitstream or data stream, more specifically from the first layer of the hierarchical representation of the data encoded into the bitstream or data stream. Such data is more specifically related to sequence(s) of modulated signals representative of vibrational effect(s). In operation 1120, it is determined whether the haptic rendering devices (i.e., the actuators) fed by the rendering engine is/are wideband devices from data representative of the characteristics of each of the haptic rendering devices obtained at operation 1118.

If the haptic device(s) is (are) wideband device(s), the method processes further with operation 1121.

If the haptic device(s) is (are) not wideband device(s), the method processes further with operation 1122.

In operation 1121, the haptic device is capable of receiving a wideband signal and all modulated signals encoded with the first and third data into the first layer, for examples in one or more of the bands 2 to 9, are processed to obtain the sequences of modulated signals.

In operation 1122, the haptic device is not capable of receiving a wideband signal, meaning that the haptic device can receive only amplitude modulated signal. In such a situation, a constant signal (for example hardcoded in the rendering engine) is modulated with specific first data representative of modulation encoded in the first layer, for example the first data encoded in the first band described with regard to the embodiment relative to quantized-based haptic data. According to a variant, a transient signal encoded as an API call is rendered if the haptic device is configured to implement such an API call.

Operations 1121 and 1122 enable to obtain vibration haptic for a number N of application frames at operation 1123.

The signal is transmitted to the actuator(s) for rendering at operation 1124. Such a process enables to adapt or adjust the rendering of the haptic signal encoded into the bitstream or data stream according to the characteristics of the haptic device(s) and their ability to render haptic effect according to the haptic perception modality of the haptic effect.

According to the haptic device, the whole data encoded into the bitstream or data stream is decoded for rendering purpose, only part(s) of data encoded into the bitstream or data stream is decoded for rendering purpose or only higher layer data or information is decoded (for example the second data representative of the haptic perception modality).

In FIGS. 1 to 11, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video and/or haptic encoders, video and/or haptic decoders, post-processors processing output from a video decoder, pre-processors providing input to a video encoder, web servers, set-top boxes, wireless connected wearable haptic devices, e.g., Bluetooth® connected wearable haptic devices, and any other device for processing haptic data or signals representative of one or more haptic feedback or effect, or other communication devices. As should be clear, the equipment may be mobile.

Computer software may be implemented by the processor 81 or by hardware, or by a combination of hardware and software. As a non-limiting example, the embodiments may be also implemented by one or more integrated circuits. The memory 82 may be of any type appropriate to the technical environment and may be implemented using any appropriate data storage technology, such as optical memory devices, magnetic memory devices, semiconductor-based memory devices, fixed memory, and removable memory, as non-limiting examples. The processor 81 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout this application are not necessarily all referring to the same embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "in accordance with an exemplary embodiment/example/implementation" or "in an exemplary embodiment/example/implementation" in various places in the specification are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received haptic signal (including possibly a received bitstream which encodes one or more haptic signals) in order to produce a final output suitable for rendering haptic effects or for further processing in the reconstructed haptic feedback or effect. In various embodiments, such processes include one or more of the processes typically performed by a decoder. In various embodiments, such processes also, or alternatively, include processes performed by a decoder of various implementations described in this application, for example, Various implementations involve encoding. In an analogous way to the above discussion about "decoding", "encoding" as used in this application may encompass all or part of the processes performed, for example, on an input haptic signal in order to produce an encoded bitstream. In various embodiments, such processes include one or more of the processes typically performed by an encoder. In various embodiments, such processes also, or alternatively, include processes performed by an encoder of various implementations described in this application.

Additionally, this application may refer to "obtaining" various pieces of information. Obtaining the information may include one or more of, for example, estimating the information, calculating the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, or estimating the information.

Also, as used herein, the word “signal” refers to, among other things, indicating something to a corresponding decoder. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word “signal”, the word “signal” may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a haptic signal for a haptic effect in a bitstream of encoded haptic signal data, the method comprising:

encoding a hierarchical structure of said haptic signal, said hierarchical structure comprising a plurality of layers, a hierarchical level being associated with each layer of said plurality of layers, said encoding comprising:

encoding, in a first layer of said plurality of layers, a first data for a modulation to be applied to at least a base signal; and encoding, in a layer of said plurality of layers having a hierarchical level higher than a hierarchical level of said first layer, a second data for a haptic perception type associated with said haptic effect.

2. The method according to claim 1, further comprising encoding, in said first layer, a first set of base signals including said at least a base signal by encoding a third data for each base signal of said first set of base signals, said each base signal being represented in a determined space, said determined space being related to said haptic perception type, said third data belonging to a set of data comprising:

a form of said at least a base signal, a phase of said at least a base signal, and characteristics of said at least a base signal, including at least one of amplitude, frequency and offset.

3. The method according to claim 2, comprises:

wherein said first of coordinates of a plurality of points in said determined space.

4. The method according to claim 2, wherein said plurality of layers comprises a second layer having a hierarchical level higher than the hierarchical level of said first layer, a third layer having a hierarchical level higher than the hierarchical level of said second layer and a fourth layer having a hierarchical level higher than the hierarchical level of said third layer, the method further comprising:

encoding, in said second layer, a second set of sequences each comprising at least a sequence of one or more modulated signals, by encoding, for each sequence of said second set of sequences, a first information for a sequential order of said one or more modulated signals, each modulated signal being obtained from said at least a base signal of said first set modulated from the first data associated with said at least a base signal;

encoding, in said third layer, a third set of first combinations comprising at least a first combination of one or more sequences of said second set of sequences, by encoding, for each first combination, a second information for a number of sequences included in said each first combination; and encoding, in said fourth layer, a second combination of one or more first combinations of said third set, by encoding a third information representative of for a number of first combinations comprised in said second combination.

5. The method according to claim 4, wherein at least a sequence of said second set of sequences comprises a plurality of modulated signals obtained from base signals of different forms.

6. The method according to claim 1, wherein said at least a base signal corresponds to a constant signal.

7. The method according to claim 1, further comprising encoding metadata in at least one layer of said plurality of layers, at least a part of said metadata including data for an Application Program Interface call associated with said at least a base signal.

8. A method of decoding a haptic signal from encoded haptic signal data, the haptic signal represents a haptic effect, comprising:

decoding a hierarchical representation of said haptic signal, said hierarchical representation comprising a plurality of layers, a hierarchical level being associated with each layer of said plurality of layers, said decoding including:

decoding, from a first layer of said plurality of layers, a first data for modulation applied to at least a base signal; and decoding, from a layer of said plurality of layers having a hierarchical level higher than a hierarchical level of said first layer, a second data for a haptic perception type associated with said haptic effect.

9. The method according to claim 8, further comprising decoding, from said first layer, a first set of base signals comprising said at least a base signal by decoding third data for each base signal of said first set of base signals, each base signal being represented in a determined space, said determined space being related to said haptic perception type, said third data belonging to a set of data comprising:

a form of said at leas base signal, a phase of said at least a base signal, and characteristics of said at least a base signal, comprising at least one of amplitude, frequency and offset.

10. The method according to claim 9, wherein said first data includes coordinates of a plurality of points in said determined space.

11. The method according to claim 9, wherein said plurality of layers further comprises a second layer having a hierarchical level higher than the hierarchical level of said first layer, a third layer having a hierarchical level higher than the hierarchical level of said second layer and a fourth layer having a hierarchical level higher than the hierarchical level of said third layer, the method further comprising:

decoding, from said second layer, a second set of sequences each including at least a sequence of one or more modulated signals, by decoding, for each sequence of said second set of sequences, a first information for a sequential order of said one or more modulated signals, each modulated signal being obtained from a base signal of said first set modulated from the first data associated with said at least a base signal;

decoding, from said third layer, a third set of first combinations including at least a first combination of one or more sequences of said second set of sequences, by decoding, for each first combination, a second information for a number of sequences included in said each first combination; and decoding, from said fourth layer, a second combination of one or more first combinations of said third set, by decoding a third information for a number of first combinations included in said second combination.

12. The method according to claim 11, wherein at least a sequence of said second set of sequences comprises a plurality of modulated signals obtained from base signals of different forms.

13. The method according to claim 8, wherein said base signal corresponds to a constant signal.

14. The method according to claim 8, further comprising decoding metadata from at least one layer of said plurality of layers, at least a part of said metadata comprising data for an Application Program Interface call associated with said at least a base signal.

15. An apparatus for encoding a haptic signal for a haptic effect in a bitstream of encoded haptic signal data, wherein said apparatus comprises a memory associated with at least a processor configured to implement operations including:

encoding a haptic signal in a bitstream of encoded haptic signal data, the haptic signal being of haptic effect, by encoding a hierarchical structure of said haptic signal, said hierarchical structure comprising a plurality of layers, a hierarchical level being associated with each layer of said plurality of lavers, said encoding comprising:

encoding, in a first layer of said plurality of layers, first data of modulation to be applied to at least a base signal; and encoding, in a layer of said plurality of lavers having a hierarchical level higher than a hierarchical level of said first layer, second data of a haptic perception type associated with said haptic effect.

16. An apparatus for decoding a haptic signal for a haptic effect from a bitstream of encoded haptic signal data, wherein said apparatus comprises a memory associated with at least a processor configured to implement operations including:

decoding a haptic signal from encoded haptic signal data, the haptic signal of a haptic effect, by decoding a hierarchical structure of said haptic signal, said hierarchical structure comprising a plurality of layers, a hierarchical level being associated with each layer of said plurality of layers, said decoding comprising:

decoding, from a first layer of said plurality of layers, first data for modulation to be applied to at least a base signal; and decoding, from a layer of said plurality of layers having a hierarchical level higher than a hierarchical level of said first layer, second data for a haptic perception type associated with said haptic effect.

* * * * *